Figure 1:
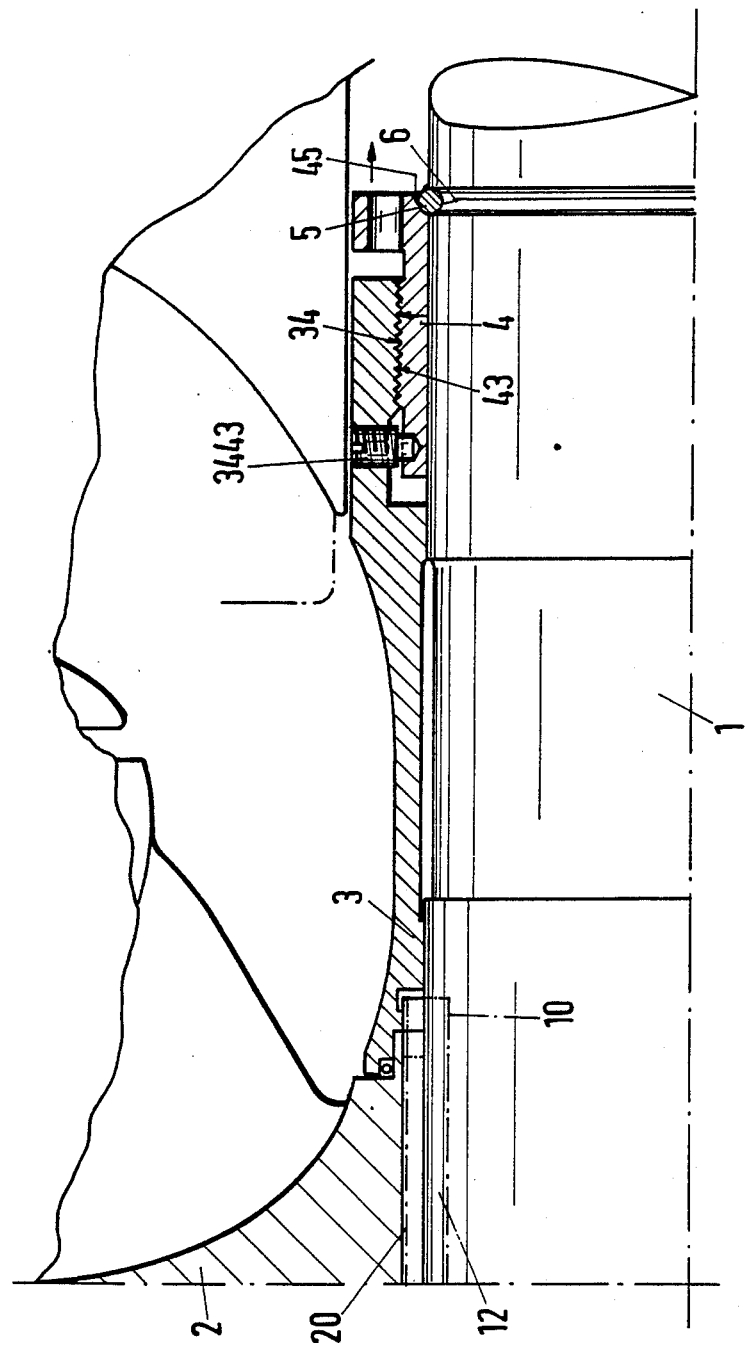

United States Patent [19]

Medgvesy

[11] Patent Number: 4,948,288

[45] Date of Patent: Aug. 14, 1990

[54] LOCKING ARRANGEMENT FOR A MACHINE PART ON A SHAFT

[75] Inventor: Stephen Medgvesy, Welsikon, Switzerland

[73] Assignee: Sulzer Brothers Limited, Winterthur, Switzerland

[21] Appl. No.: 383,862

[22] Filed: Jul. 21, 1989

[30] Foreign Application Priority Data

Aug. 8, 1988 [CH] Switzerland .......................... 2999/88

[51] Int. Cl.⁵ ............................................... F16B 1/00
[52] U.S. Cl. ...................................... 403/24; 403/261; 403/259
[58] Field of Search ......................... 403/259, 261, 24; 411/517, 530

[56] References Cited

U.S. PATENT DOCUMENTS

| | | | |
|---|---|---|---|
| 872,883 | 12/1907 | Adams | 403/261 |
| 1,650,573 | 11/1927 | Searles | 403/261 |
| 2,836,041 | 5/1958 | Petrie | 64/9 |
| 2,918,335 | 12/1959 | Fruendt | 403/362 X |
| 3,413,022 | 11/1968 | Waddell | 403/261 |
| 3,631,688 | 1/1972 | Quick | 64/9 R |
| 4,136,989 | 1/1979 | Bianco | 403/261 |
| 4,436,468 | 3/1984 | Ozaki | 403/362 X |

FOREIGN PATENT DOCUMENTS

| | | |
|---|---|---|
| 0499929 | 6/1930 | Fed. Rep. of Germany . |
| 1055962 | 4/1959 | Fed. Rep. of Germany . |
| 0973550 | 3/1960 | Fed. Rep. of Germany . |
| 1118012 | 11/1961 | Fed. Rep. of Germany . |
| 0327737 | 12/1902 | France . |
| 0770683 | 3/1957 | United Kingdom . |
| 1205199 | 9/1970 | United Kingdom . |

Primary Examiner—Andrew V. Kundrat
Attorney, Agent, or Firm—Kenyon & Kenyon

[57] ABSTRACT

The locking arrangement for the axle fixing of machine parts on shafts and axles as a pair of sleeves which can be telescopically threaded into each other. In addition, the internal clamping sleeve is threaded into an abutment with a stop ring provided in a groove of the shaft or axle. The locking arrangement avoids the need for threads on the shaft and leads to the simplified manufacturer of the shaft.

20 Claims, 2 Drawing Sheets

LOCKING ARRANGEMENT FOR A MACHINE PART ON A SHAFT

This invention relates to a locking arrangement for a machine part on a shaft.

As is known, various devices have been used for fixing machine parts such as turbo machine rotors, pump rotors and vanes, gears, and the like on shafts or axles. Generally, a non-rotational connection of these machines parts with an axle or shaft is carried out using a tongue-and-groove part or key which engages in grooves, for example, axial grooves in the shaft and the machine part. In order to retain the machine parts in an axial direction, use has been made of sleeves which have a female thread and which can be threaded onto a thread on the shell of the shaft or axle so as to be positioned axially. Such a sleeve may be present on both sides of the machine part or only on one side. In addition, a stop may be integrally formed on a shaft or axle for abutting one side of the machine part while a threaded sleeve is threaded onto the shaft or axle on the other side of the machine part.

However, due to the narrow notch radii which exist in threads, particularly at the base, applying a male thread to a shaft may lead to an undesired weakening and an increased tendency to fissuration and corrosion of the shaft. For machine parts which are exposed to corrosive media, as is often the case with pumps, such disadvantages are especially pronounced.

Accordingly, it is an object of the invention to provide a relatively simple locking arrangement for the fixation of a machine part on a shaft.

It is another object of the invention to be able to axial fix a machine part on a shaft or axle without perceptible weakening of the shaft or axle.

It is another object of the invention to be able to mount a machine part on a shaft without increasing the susceptibility of the shaft to corrosion.

Briefly, the invention provides a locking arrangement, for example, for locking a machine part coaxially on a shaft. The locking arrangement includes a first sleeve for slidable mounting on the shaft, a second sleeve for telescopically fitting with the first sleeve, means for releasably connecting the sleeves together in coaxial relation and a stop for positioning in a groove of the shaft and against an end of the second sleeve remote from the first sleeve.

With this locking arrangement, the shaft (or axle) requires no elements with narrow and small notch radii as would be the case, for example, in screw threads.

The means for releasably connecting the sleeves together may include an internal thread in one sleeve and an external thread on the other sleeve. In addition, an adjustable securing means is provided for securing the sleeves together in fixed relation. Such an adjustable securing means may be a form of a screw which passes through one sleeve into the other sleeve.

The stop of the locking engagement may be in the form of a ring, such as a ring of titanium and may be seated with an annular groove in the shaft. This groove may, for example, have a radius of about 6 millimeters, which is large in comparison with the screw threads. Aside from the excellent mechanical strength of $10^3 N/mm^2$ which is much better than steel, titanium has the advantage of being corrosion resistant. Further, as opposed to threads which require machining on a shaft in a cost-intensive operation, the sleeves of the locking arrangement do not require any stepped reductions on the shaft. In any event, the shaft diameter is not reduced, thus, the shaft has an increased rigidity, and, particularly, an increased bending strength as compared to a threaded shaft.

Should the thread, for example an M $130 \times 4$ thread size between the two sleeves, for example, after prolonged operation, the machine part, for example, a pump rotor may be removed without damaging the shaft itself. Moreover, the construction of the locking arrangement permits an exact determination of the tightening moment at the time of installation. Hence, no subsequent retightening or readjusting is necessary.

In order to protect the threads of the sleeves against corrosion, seals may be provided in and at the sleeves to prevent the intrusion of a corrosive medium up to the thread and into the sliding seat (for example, a machining tolerance H7 of the bore in a pump rotor and a machining tolerance g6 of a shaft) between a pump rotor and a shaft.

Figure 2:
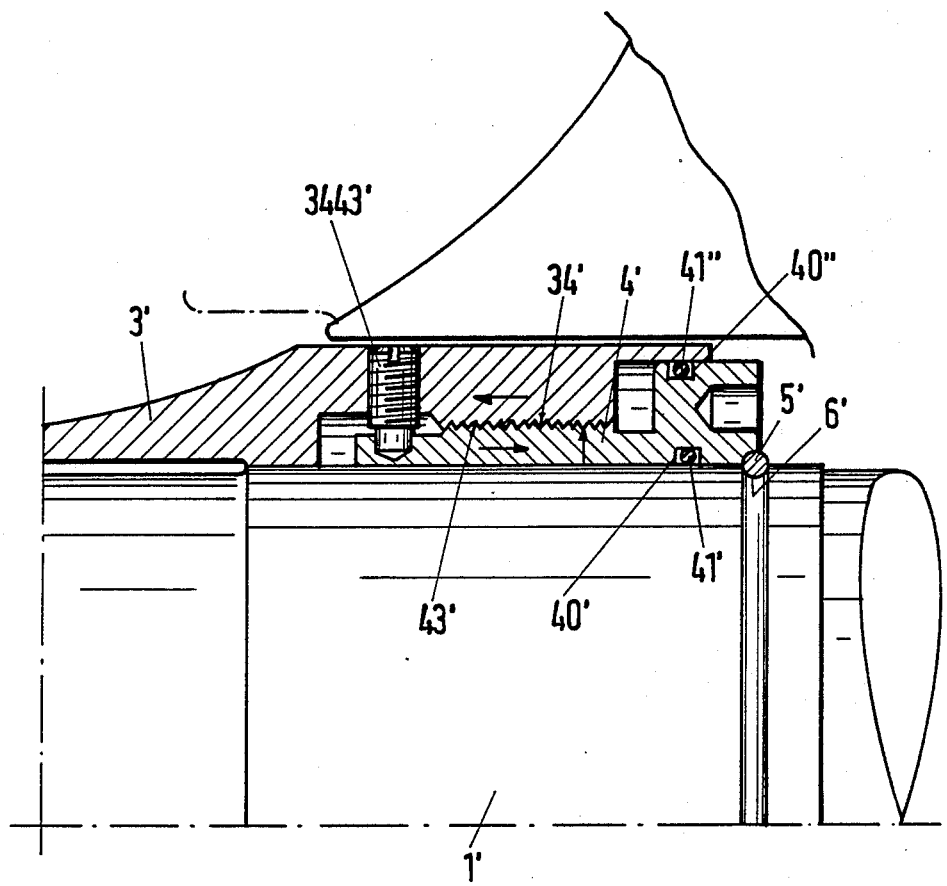

These and other objects and advantages of the invention will become more apparent from the following detailed description taken in conjunction with the accompanying drawing wherein:

FIG. 1 schematically illustrates a locking arrangement for locking a pump vane rotor on a shaft in accordance with the invention; and FIG. 2 illustrates a modified arrangement in accordance with the invention.

Referring to FIG. 1, the pump includes a rotable shaft 1 and a pump vane rotor or wheel 2 as well as a locking arrangement on at least one side of the rotor 2 for axially fixing the rotor 2 on the shaft 1.

As illustrated, the locking arrangement includes a first sleeve 3 which is coaxial of the shaft 1 and which engages the rotor 2 at one end. In addition, a second clamping sleeve 4 is telescopically fitted within the first sleeve 3 while a stop or clamping ring 5 is positioned in a groove 6 of the shaft 1 against an end of the clamping sleeve 4 remote from the first sleeve 3. A non-rotational coupling between the shaft 1 and rotor 2 is formed by a key 12 which is fitted in axial grooves 10, 20 of the shaft 1 and rotor 2, respectively.

The locking arrangement is provided with a means in the form of threads 34, 43 for releasably connecting the sleeves 3, 4 together. As indicated, the sleeve 3 is provided with an internal thread 34 while the clamping sleeve 4 is provided with an interengaging external thread 43. In addition, the clamping sleeve 4 is provided with a groove 45 dimensioned to receive the stop ring 5.

The locking arrangement also includes an adjusting securing means in the form of a radial lock screw 3443 for securing the sleeve 3, 4 together in fixed relation.

During installation, the threaded together sleeves 3, 4 are slid onto the shaft 1 with the foremost sleeve 3 abutted against the rotor 2. In this condition, the clamping sleeve 4 is threaded far enough into the foremost sleeve 3 so that the stop ring 5 can be inserted into the groove 6 in the shaft 1. Thereafter, the clamping sleeve 4 is turned in a direction for unthreading from the sleeve 3 so as to bring the clamping sleeve 4 in the direction indicated by the arrow into abutment with the stop ring 5. This is done to the extent that the securing groove 45 of the clamping sleeve 4 retains the stop ring 5 in the groove 6 of the shaft 1. The lock screw 3443 is then threaded through the foremost sleeve 3 into one of a plurality of circumferentially disposed recesses in the clamping sleeve 4 in order to secure the sleeves 3, 4 against relative rotation. The lock screw 3443, in turn, can be secured against rotation, for example by means of a lacquer such as a Loctite ® lacquer.

An identical locking arrangement (not shown) may also be used on the opposite side of the vane rotor 2. Alternately, use may be made of a stop ring located in a second groove in the shaft 1. In this case, the vane rotor 2 would be provided with a groove to secure the stop ring in place in the manner of the groove 45 at the end of clamping sleeve 4. Still further, any suitable axial stop or other abutment device may be provided.

The axial position of the vane rotor 2 is determined by the position of the stop ring 5 and of the groove 6 as well as by the screwing of the threads 34, 43, and, of course, by the position of the stop on the opposite side of the vane rotor 2.

Referring to FIG. 2, wherein like reference characters indicate like parts as above, the locking arrangement may be provided with annular seals, such as, O-rings 41', 41'' in inner and outer grooves 40', 40'' of the clamping sleeve 4'. These annular seals prevent the intrusion, for example, of a flow medium in a pump to the threads 34', 43' through the gap between the shaft 1' and sleeve 4' or between the sleeves 3', 4' Intrusion of flow medium through the threads of the lock screw 3443' can also be prevented, for example with a Loctite ® lacquer. Of course, sealing can be achieved with other sealing agents and/or with sealing means applied at another point.

The intrusion of a flow medium through a gap between the sleeve 3' and shaft 1' or between the vane rotor (not shown) and shaft 1' can be prevented if seals are also provided on the opposite sides of the rotor (not shown) or sleeve 3'. Thus, the screw threads 34', 43' can be protected to a large extent against corrosion and seizing.

The locking arrangement has been illustrated with reference to the mounting and axial positioning of vane rotors, particularly pump rotors on shafts. However, the locking arrangement is suitable and advantageous for the fixation of other machine parts on shafts or axles.

The invention thus provides a locking arrangement for fixing a machine part on a shaft without the need for threads or other weakening recesses and grooves in a shaft. Further, the invention provides a locking arrangement which can be readily installed for the fixation of a machine part on a shaft.

What is claimed is:

1. A locking arrangement comprising
  a first sleeve for slidable mounting on a shaft;
  a second sleeve for telescopically fitting with said first sleeve;
  means for releasably connecting said sleeves together in coaxial relation; and
  a stop for positioning in a groove of the shaft and against an end of said second sleeve remote from said first sleeve.

2. A locking arrangement as set forth in claim 1 wherein said means includes an internal thread in one of said sleeves and an interengaging external thread on the other of said sleeves.

3. A locking arrangement as set forth in claim 1 wherein said stop is a ring.

4. A locking arrangement as set forth in claim 3 wherein said ring is made of titanium.

5. A locking arrangement as set forth in claim 1 which further comprises an annular seal between said sleeves and an annular seal within said first sleeve for sealing against a shaft.

6. A locking arrangement as set forth in claim 1 which further comprises an adjustable securing means for securing said sleeves together in fixed relation.

7. A locking arrangement as set forth in claim 6 wherein said means for releasably connecting said sleeves includes an internal thread in one sleeve and an external thread on the other sleeve.

8. A locking arrangement as set forth in claim 7 wherein said stop is a ring.

9. A locking arrangement as set forth in claim 8 which further comprises an annular seal between said sleeves.

10. In combination;
  a shaft having an annular groove;
  a machine part coaxially mounted on said shaft in spaced relation to said groove; and
  a locking arrangement on at least one side of said machine part for axially fixing said machine part on said shaft, said arrangement including a first sleeve slidably mounted on said shaft and engaging said machine part, a second sleeve telescopically fitting within said first sleeve, means for releasably connecting said sleeves together, and a stop positioned in said groove against an end of said second sleeve remote from said first sleeve.

11. The combination as set forth in claim 10 wherein said machine part is a pump vane rotor.

12. The combination as set forth in claim 11 which further comprises a second of said locking arrangements on a second side of said pump vane rotor.

13. The combination as set forth in claim 10 which further comprises an annular seal between said second sleeve and said shaft.

14. The combination as set forth in claim 10 wherein said means includes an internal thread in said first sleeve and an interengaging external thread in said second sleeve.

15. The combination as set forth in claim 14 wherein said stop is a ring.

16. The combination as set forth in claim 15 which further comprises an adjustable screw passing through said first sleeve into said second sleeve for securing said sleeves together in fixed relation.

17. The combination as set forth in claim 14 which further comprises an annular seal between said sleeves.

18. The combination as set forth in claim 17 which further comprises an adjustable screw passing through said first sleeve into said second sleeve on a side of said threads opposite said annular seal for securing said sleeves together in fixed relation.

19. A locking arrangement comprising
  a first sleeve for slidable mounting on a shaft;
  a second sleeve for slidable mounting on the shaft in telescopic fitting relation within said first sleeve;
  means for releasably connecting said sleeves together in coaxial relation; and
  a stop for positioning in a groove of the shaft and against an end of said second sleeve remote from said first sleeve.

20. A locking arrangement as set forth in claim 1 which further comprises an adjustable securing means for securing said sleeves together in fixed relation and wherein said means for releasably connecting said sleeves includes an internal thread in one sleeve and an external thread on the other sleeve.

* * * * *